United States Patent [19]

Woodward

[11] 4,313,206
[45] Jan. 26, 1982

[54] CLOCK DERIVATION CIRCUIT FOR DOUBLE FREQUENCY ENCODED SERIAL DIGITAL DATA

[75] Inventor: Thomas R. Woodward, West Chester, Pa.

[73] Assignee: Burroughs Corporation, Detroit, Mich.

[21] Appl. No.: 86,268

[22] Filed: Oct. 19, 1979

[51] Int. Cl.³ ............................................. H03K 13/20
[52] U.S. Cl. .................................... 375/110; 328/63; 328/72; 328/77
[58] Field of Search ................... 329/145, 107, 50, 100; 375/82, 87, 84, 110; 340/167 B, 170; 328/56, 109, 118, 77, 55, 72, 63; 371/42, 46; 307/210, 232; 360/40–45, 48, 49, 53; 358/264

[56] References Cited

U.S. PATENT DOCUMENTS

| | | | |
|---|---|---|---|
| 3,271,742 | 9/1966 | Rumble | 340/170 |
| 3,271,750 | 9/1966 | Padalino | 360/45 |
| 3,405,391 | 10/1968 | Halfhill | 360/43 |
| 3,480,869 | 11/1969 | Hubbard | 375/84 |
| 3,611,158 | 10/1971 | Strathman | 328/119 |
| 4,010,323 | 3/1977 | Peck | 375/84 |
| 4,019,149 | 4/1977 | Kustka | 375/84 |
| 4,185,273 | 1/1980 | Gowan | 360/43 |
| 4,234,897 | 11/1980 | Miller | 360/45 |

Primary Examiner—Benedict V. Safourek
Assistant Examiner—Stephen Chin
Attorney, Agent, or Firm—Mark T. Starr

[57] ABSTRACT

A circuit arrangement for extracting clocking signals from double frequency encoded transition-event waveforms. The incoming waveform is fed directly into a digital delay line which generates three versions of the incoming waveform, each delayed by ¼, ½ and ¾ of the incoming waveform's bit cell time, respectively. Transitions in the incoming waveform are detected by comparing the output of the first delay line tap with the incoming waveform and simultaneously comparing the outputs of the second and third delay line taps, thus generating first and second transition waveforms that are identical but out of phase by one-half bit cell. The two generated transition waveforms are used to form a composite clock which is then used to toggle a flip-flop at one-half bit cell intervals. The true and false outputs of the flip-flop are then gated with the first and second generated transition waveforms, respectively, to produce the two desired clocking signals, the first clocking signal providing pulses commencing at the incoming waveform's guaranteed transitions, the second clocking signal providing pulses commencing one-half bit cell after the incoming waveform's guaranteed transitions.

36 Claims, 4 Drawing Figures

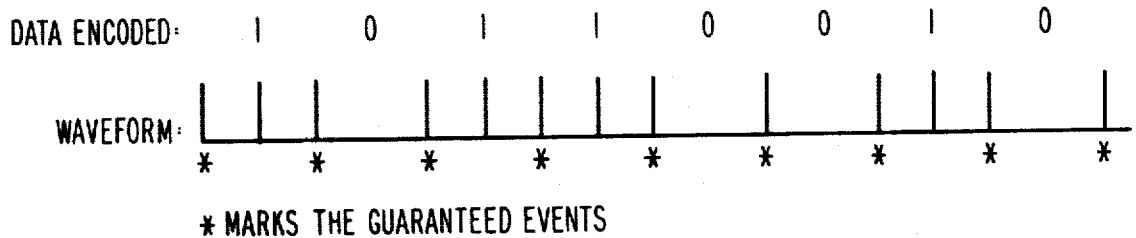
*MARKS THE GUARANTEED EVENTS
_Fig.1_
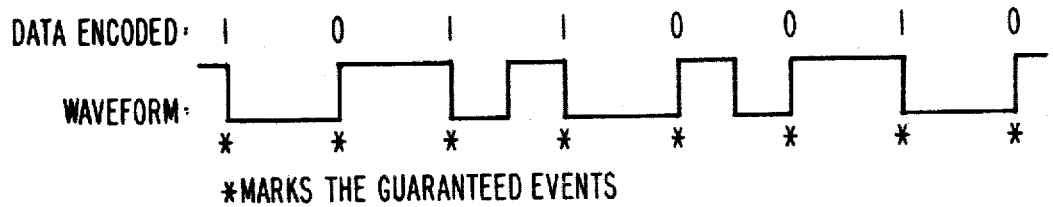
*MARKS THE GUARANTEED EVENTS
_Fig.2_
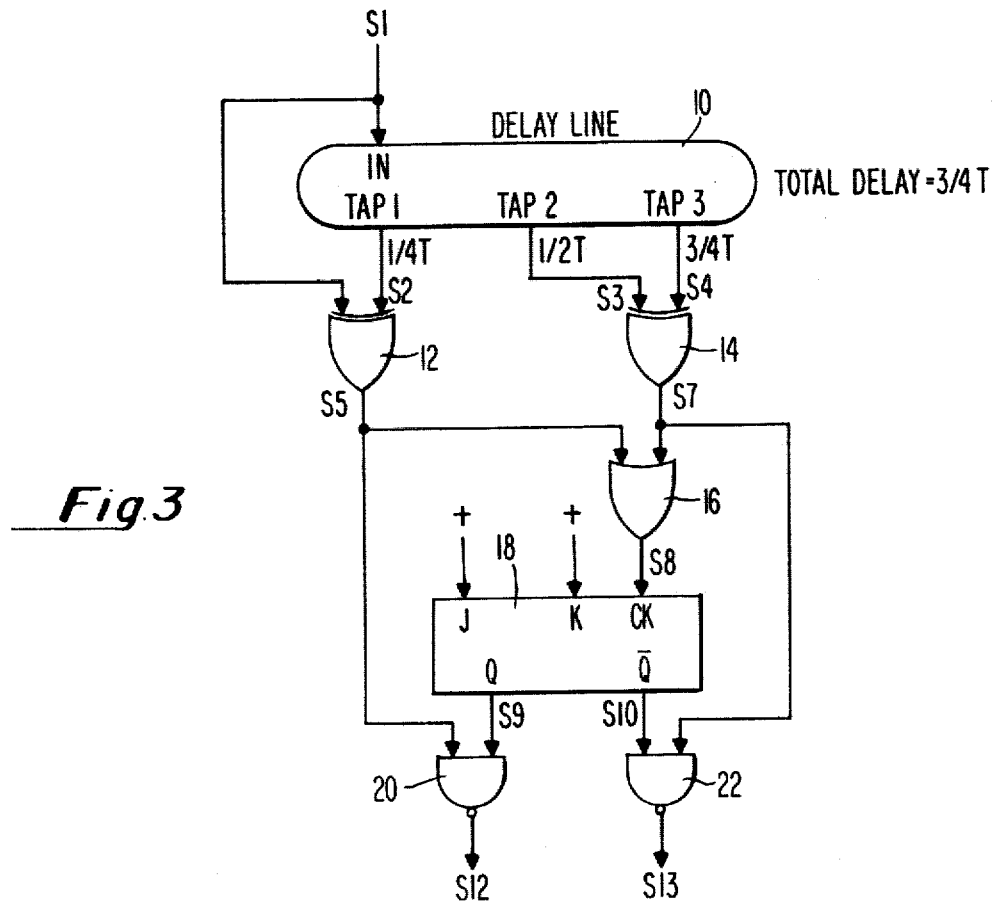
_Fig.3_

CLOCK DERIVATION CIRCUIT FOR DOUBLE FREQUENCY ENCODED SERIAL DIGITAL DATA

BACKGROUND OF THE INVENTION

Serial digital data is frequently transmitted using a self-clocking encoding. The basic idea behind these self-clocking codes is to guarantee that a certain minimum number of digital "events" (pulses or transitions in level) occur within the digital waveform. These "guaranteed" events can then be used to establish and reconstruct frequency and phase of the clocking signals which were used to encode and transmit the data.

"Double frequency" encoding is the simplest of the self-clocked encodings and has many variants; two of these variants are known as "frequency modulated" (FM) and "biphase". FM and biphase encodings differ slightly, but have as a common characteristic the guarantee that at least one, but no more than two digital events occur per bit cell in the digital waveform. A bit cell is that portion of the waveform which is generated by one cycle of the basic digital clock and contains a single binary 0 or binary 1. The presence or absence of the second (non-guaranteed) event depends upon the data being encoded.

Examples of FM and biphase encoding are illustrated in FIGS. 1 and 2, respectively. In the given example of FM (FIG. 1), pulses are the events of interest. In the given example of biphase, transitions of level are the events of interest.

In FM encoding (FIG. 1), a binary 1 is represented by two consecutive events occurring one-half bit cell apart, with a bit cell defined as the time between two guaranteed transitions. Binary 0 is represented by a single event at the beginning of a bit cell.

In biphase encoding (FIG. 2), the guaranteed event is a transition in level occurring in the middle of each bit cell. A binary 1 is distinguished from a binary 0 by the relative phase of the waveform surrounding the guaranteed transition. Thus, in the example shown in FIG. 2, a binary 1 is represented by             and a binary 0 is represented by           . Transitions occurring between the guaranteed transitions are required whenever two consecutive bit cells carry the same binary data value.

As will be obvious to those skilled in the art, an FM pulse event waveform may be converted to an equivalent FM transition-event waveform by using the FM pulse event waveform to toggle a flip-flop, and then using an output of the flip-flop, as the transition-event waveform. All biphase waveforms are of the transition-event type since the phase of the waveform is crucial to the successful recovery of the encoded data. Therefore, the preferred embodiment of the present invention is designed to be driven by transition-event waveforms only.

Recovering data from a double frequency encoding depends on the ability to recognize the guaranteed transitions and to synchronize some timing circuit with these recognized guaranteed transitions. The output of the timing circuit can then be used, along with some additional logic, to extract data from the waveform. In the prior art, various timing circuits have been used for this purpose. Two commonly used techniques are briefly discussed below.

In the first prior art technique, monostable multivibrators triggered by the guaranteed transitions define a "window" during an interval when a non-guaranteed transition may occur. The pulses produced by the monostables are then used to extract data from the waveform. Technique 1 has the advantage of simplicity, but suffers from wide variations in timing common with monostables. Further, technique 1 is quite susceptible to spurious operation induced by noise in the incoming waveform and is limited to usage with relatively low frequency signals.

In the second prior art technique, a variable frequency oscillator is synchronized to the incoming frequency by means of a phase-locked loop. The output of the oscillator is then used to extract data from the incoming waveform. Technique 2 eliminates the timing tolerance problem associated with technique 1 and is much less prone to noise induced failure. However, technique 2 is substantially more complex than technique 1.

In certain applications where units containing circuits exemplified by techniques 1 to 2 are placed in series, such as in a ring network, the clocking signals derived from the incoming waveform are used to construct an outgoing waveform for transmission to the next unit downline. In such a configuration, "jitter" (viz., timing uncertainty) in the output waveform must be minimized since the jitter may cascade and be amplified by passage through several units in series. Phase locked loops, such as those of technique 2, always exhibit frequency jitter. The amount of jitter is traded off against capture time (time to go from initial "unlocked" state to "locked") and lock range (input frequency range within which the phase-locked loop will eventually enter the locked condition). Since less jitter means less tracking ability and hence greater sensitivity to component value tolerances, technique 2 may be unsuitable for applications in which many units, each containing the extraction circuit, are cascaded in series. Using technique 1 it is possible to design a circuit which exhibits no jitter beyond that present in the incoming waveform, but one that suffers from the aforementioned drawbacks.

OBJECTS OF THE INVENTION

It is the general object of the present invention to overcome these and other drawbacks of the prior art by providing an improved clock derivation circuit arrangement for double frequency encoded serial digital data.

It is a further object of the present invention to provide an improved clock derivation circuit arrangement which is characterized by the simplicity of technique 1 without its component value sensitivity.

It is another object of the present invention to provide an improved clock derivation circuit arrangement which will not introduce additional jitter when utilized in a cascade arrangement such as a ring network.

It is still a further object of the present invention to provide an improved clock derivation circuit arrangement whose noise sensitivity is no greater than clock derivation circuits utilizing monostable multivibrators (technique 1).

It is yet another object of the present invention to provide a clock derivation circuit arrangement capable of operating at frequencies higher than those possible with circuits utilizing monostable multivibrators (technique 1).

It is still another object of the present invention to provide a circuit arrangement which derives a clock signal which identifies the commencement of each guaranteed transition in an inputted double frequency encoded transition-event waveform.

Still further, it is another object of the present invention to provide a circuit arrangement which derives a clock signal which commences one-half bit time after the commencement of each guaranteed transition in an inputted double frequency encoded transition-event waveform.

These and other objects, features and advantages of the present invention will become more apparent from the description of the preferred embodiment of the present invention when read in conjunction with the drawings contained herewith.

SUMMARY OF THE INVENTION

The foregoing objects of the present invention are achieved by providing a circuit arrangement which receives a double frequency encoded transition-event waveform and derives two sets of clocking signals from the waveform received. The clocking signals derived are pulses of ¼ T duration, where T is the length of a bit cell in the encoded waveform. The two clocking signals derived are ½ T out of phase with each other, giving available clock edges at 0T, ¼ T, ½ T and ¾ T in each bit cell.

The incoming double frequency encoded transition-event waveform is fed directly into a digital delay line which generates three versions of the incoming waveform, each delayed by ¼ T, ½ T or ¾ T respectively. Transitions in the incoming waveform are detected by comparing the ½ T output of the delay line with the incoming signal by means of a first exclusive OR gate, thus providing a positive pulse of ¼ T duration for each transition of level in the incoming waveform. A second exclusive OR gate performs an identical function on the incoming waveform delayed by ¼ T, the second exclusive OR gate receiving its inputs from the ¼ T and ¾ T outputs of the delay line. The output of the second exclusive OR gate is therefore identical to the output of the first exclusive OR gate delayed by ¼ T.

A composite clock is derived by ORing together the outputs of the first and second exclusive OR gates, the output of the OR gate thus providing two pulses per bit cell T, and more particularly providing exactly two negative going transitions per bit cell spaced approximately ½ T apart. The composite clock formed at the output of the OR gate is used to clock a flip-flop, the flip-flop being of the type that is triggered by a negative going transition. As a result, the flip-flop is clocked every ½ T.

The true and false outputs of the flip-flop are then gated with outputs of the first and second exclusive OR gates, respectively, as inputs to first and second NAND gates, respectively, to produce the desired clocking signals at the outputs of the first and second NAND gates, respectively.

BRIEF DESCRIPTION OF THE DRAWINGS

FIG. 1 is an example showing data encoded as an FM pulse event waveform.

FIG. 2 is an example showing data encoded as a biphase transition-event waveform.

FIG. 3 is a schematic drawing of the preferred embodiment of the clock extraction circuit of the present invention.

DESCRIPTION OF THE PREFERRED EMBODIMENT

Figure 4:
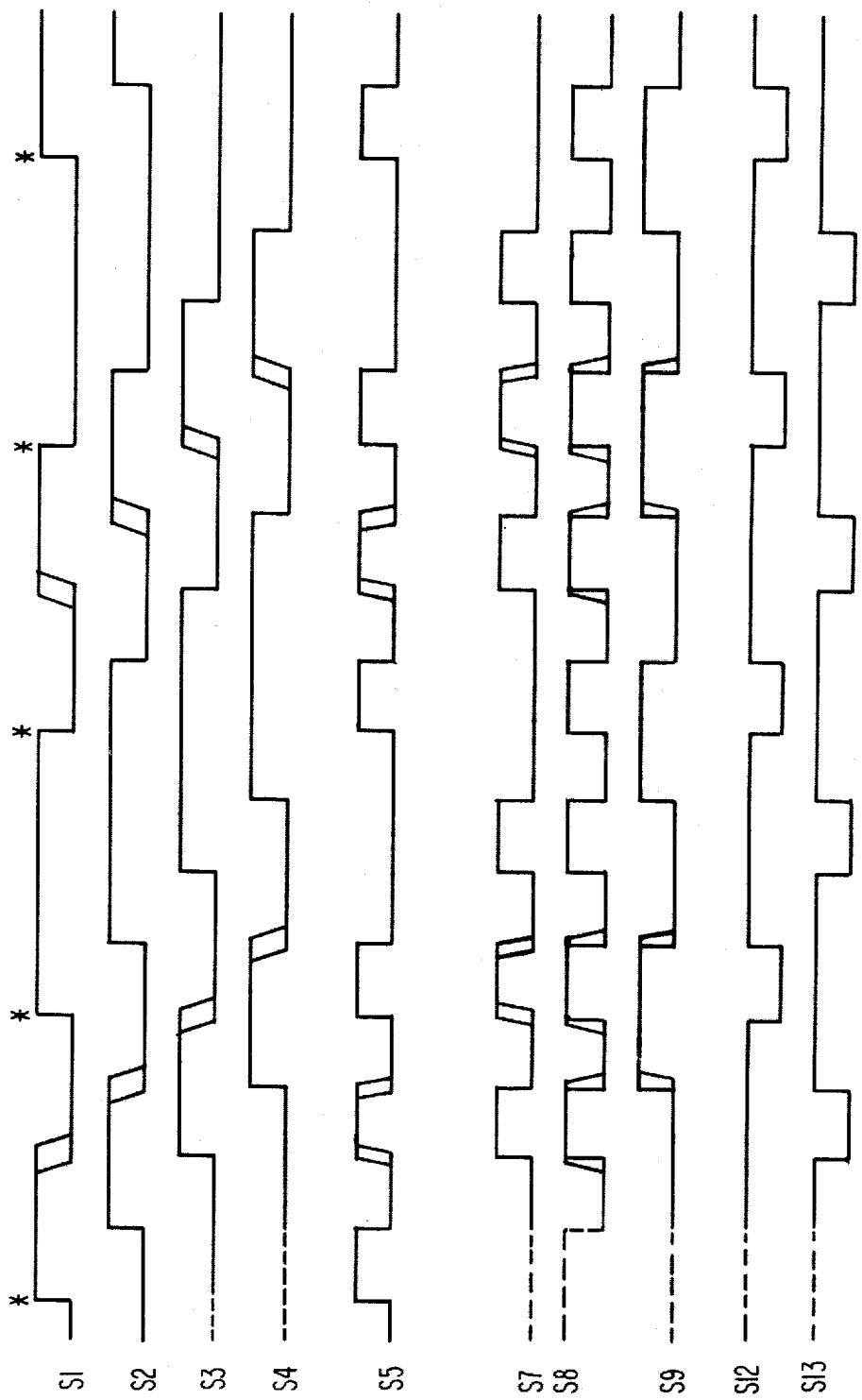
FIG. 4 is a timing diagram showing the input waveform, internal signals generated and clocks derived by the clock extraction circuit of FIG. 3.

FIG. 3 shows the clock derivation circuit utilized in the preferred embodiment of the present invention. The circuit shown extracts two clock signals S12, S13 from a double frequency encoded transition-event waveform provided as the input S1. The preferred embodiment of the present invention is designed to handle waveforms having a frequency of 1 MHz. However, those skilled in the art will realize that the present invention may be readily modified to handle different frequency waveforms and will be most beneficial when used with waveforms having a frequency equal to or greater than 1 MHz. The clocks S12, S13 derived are negative pulses of ¼ T duration, where T is the length of a bit cell in the encoded waveform (in the preferred embodiment, T is 1 microsecond). The two clocks S12, S13 are ½ T out of phase with each other, giving available clock edges at 0 T, ¼ T, ½ T and ¾ T in each bit cell.

The basic timing element used in the preferred embodiment is a digital delay line 10 with three taps S2, S3, S4. These taps S2, S3, S4 are for delays of ¼ T, ½ T and ¾ T respectively. The incoming waveform S1 is sent directly into the delay line 10. This results in the generation of three delayed versions S2, S3, S4 of the waveform S1 at the output of delay line 10 (FIG. 4). In the preferred embodiment of the present invention, a Technitrol TTLDL750C digital delay line having a total delay of ¾ T, or 750 nanoseconds, is utilized to correspond to the frequency of input waveform S1.

Referring to FIG. 4, the incoming waveform S1 is shown with asterisks above the guaranteed transitions. The non-guaranteed transitions in S1 are shown with an uncertainty interval since the exact position of the non-guaranteed transitions is determined by the characteristics of the delay line in the preceding unit (assuming a cascade arrangement of units utilizing the present invention). The guaranteed transitions on the outgoing waveform from a preceding unit may be generated by the leading edge of one of the derived clock signals S12. As will be seen, this leading edge is derived directly from the guaranteed transition of the incoming waveform. Thus, the guaranteed transitions on the outgoing waveform are derived from the guaranteed transitions of the incoming signal without any dependence on the timing element 10 within the unit. Therefore, the guaranteed transitions are "precise" in the sense that the interval between these guaranteed transitions is constant throughout the chain of cascade units. To the contrary, the center (non-guaranteed) transitions are derived from timing signal S13. Timing signal S13 is derived from signals out of the delay line 10. Thus, the exact position of a center (non-guaranteed) transition relative to its neighboring guaranteed transitions is subject to an uncertainty interval determined by the timing tolerance of the delay line 10. On the assumption that units containing the present invention are cascaded, the incoming signal S1 will also have an uncertainty interval surrounding center transitions, as shown in FIG. 4.

The preferred embodiment of the present invention (FIG. 3) is implemented using the following integrated circuit types:

Exclusive OR gates 12, 14—74LS86
OR gate 16—74LS32
Flip-flop 18 (Dual J-K, negative edge triggered)—74LS76
NAND gates 20, 22—74LS00

However, those skilled in the art will realize that various substitutions in the components used may be made without departing from the spirit of the present invention.

The operation of the clock derivation circuit will now be explained in detail.

As previously mentioned, the input waveform S1 to the clock derivation circuit is a double frequency encoded transition-event waveform S1 (FIG. 4) with the guaranteed transition identified by asterisks. Transitions in input waveform S1 are detected by comparing the output of the first tap S2 of the delay line 10 with S1. The comparison is performed by exclusive OR gate 12, whose output is low whenever both of its inputs are the same and high when they are different. The resulting signal S5 (FIG. 4) provides a positive pulse of ¼ T duration for each transition of level in S1. Some of these positive pulses in S5 are "fuzzy" (having uncertainty intervals) because they derive from the fuzzy center transition. Another exclusive OR gate 14 performs an analogous function on the incoming signal S1 delayed by ¼ T. That is, the inputs S1, S2 to exclusive OR gate 12 are out of phase by ¼ T as are the inputs S3, S4 to exclusive OR gate 14. Thus, the output S7 of exclusive OR gate 14 is identical to the output S5 of exclusive OR gate 12 delayed by ¼ T.

The output S5 of exclusive OR gate 12 has a "clean" (i.e., not fuzzy) pulse for each guaranteed transition in input waveform S1, and so has one clean pulse per bit cell commencing with each guaranteed transition in S1 and lasting ¼ T. Since S7 is simply S5 delayed, S7 has one clean pulse per bit cell commencing at ¼ T after each guaranteed transition and lasting until ¾ T.

The clocks which are to be derived are S12 and S13. Clock pulse S12 is a ¼ T negative pulse commencing with each guaranteed transition. Clock pulse S13 is a ¼ T negative pulse commencing ½ T after each guaranteed transition. In order to complete the task of deriving clocks S12 and S13, the clean pulses must be isolated out of the S5 and S7 waveforms. The means for isolating out just the clean pulses is provided by flip-flop 18. In normal operation (i.e., the incoming waveform S1 is in sync. and there is no noise on S1), flip-flop 18 simply toggles (changes state) every ½ T (FIG. 4). Its true and false outputs S9 and S10, respectively, are then gated with S5 and S7 respectively through NAND gates 20 and 22, respectively, to produce the desired clocking signals S12 and S13, respectively.

In order for flip-flop 18 to change state, it must be clocked. Flip-flop 18 is triggered by a negative going transition at its clock input. In order for flip-flop 18 to change state every ½ T, a composite clock for flip-flop 18 is derived by ORing together S5 and S7 via OR gate 16 to produce S8 (FIG. 4). Each of these signals S5, S7 has at least one pulse per bit time T, and S7 is S5 delayed ¼ T. Furthermore, if S5 has a second pulse (the fuzzy one), it overlaps the clean pulse in S7 and vice versa. Therefore, the composite clock S8 has exactly two pulses per bit cell T, and more particularly S8 has exactly two negative going transitions per bit cell T. These negative going transitions in S8 are spaced approximately ½ T apart and thus flip-flop 18 is clocked every ½ T.

Since the outputs S9, S10 of flip-flop 18 are being used to isolate the clean (i.e., not fuzzy) pulses on S5, S6 which correspond to the negative pulses on S12, S13 respectively, closer attention must be given to the fuzziness of clocking signal S8. S8 is the logical OR of S5 and S7. Thus, S8 must be high as long as either S5 or S7 is high. Referring now to FIG. 4, and more particularly to an instance of a clean pulse occurring on S5 coincident with a fuzzy pulse on S7, it will be seen that the S7 pulse may begin before or after the S5 pulse and may end before or after the S5 pulse. Further, as will be obvious to those skilled in the art, the timing tolerance associated with the delay is not so large as to allow the S7 pulse to end before the S8 pulse begins. Thus, S8 goes high no later than S5 goes high (disregarding gate propagation delay) and goes low no earlier than S5 goes low. This is illustrated in FIG. 4 by the halving of the uncertainty interval. This same logic applies to the case of a clean pulse on S7 coinciding with a fuzzy pulse of S5. Any pulse occurring on S5 without a coincident pulse on S7, or vice versa, must be a clean pulse since a clean pulse occurs every ½ T on either S5 or S7.

The implication from the discussion of the last paragraph is that the negative going edges on S8 always occur no earlier than the end of the clean pulse on either S5 or S7. Thus, since flip-flop 18 is triggered by negative going edges on S8, flip-flop 18 changes state after the end of the clean pulse on either S5 or S7. Since the outputs S9 and S10 of flip-flop 18 are being used to isolate the clean pulses on S5 and S7, the implication is that an entire clean pulse from S5 or S7 is allowed through NAND gates 20 or 22, respectively, before flip-flop 18 changes state to select the next clean pulse from S7 or S5 respectively. Additionally, by the same logic, a negative edge on S8 may occur no earlier than the end of a fuzzy pulse on S5 or S7, and thus flip-flop 18 changes state at the later of the end of the pulse on S5 or the end of the pulse on S7. Consequently, when flip-flop 18 changes state to enable NAND gate 22 rather than NAND gate 20 or vice versa, it is guaranteed that no trailing part of a pulse on S5 or S7 will be allowed through NAND gate 20 or NAND gate 22, respectively.

Having shown and described the preferred embodiment of the present invention, those skilled in the art will realize that various omissions, substitutions and changes in forms and details may be made without departing from the spirit of the present invention. It is the intention, therefore, to be limited only as indicated by the scope of the following claims.

What is claimed is:

1. A circuit arrangement for reconstructing the timing information encoded in an incoming double frequency transition-event waveform, said incoming waveform characterized as including both guaranteed and non-guaranteed transitions, said incoming waveform further characterized as having a bit cell duration of T, said circuit arrangement comprising:

delay line means, responsive to said incoming waveform, said delay line means for generating delayed versions of said incoming waveform;

detecting means, responsive to said incoming waveform and said generated delayed versions of said incoming waveform, said detecting means for detecting each transition in said incoming waveform and producing first and second transition waveforms, each of said transition waveforms identifying each transition in said incoming waveform, the second transition waveform corresponding to the first transition waveform delayed by a fixed time interval;

composite clock forming means, connected to said detecting means, said composite clock forming means for forming a composite clock from said two transition waveforms;

toggling means, receiving an input from the output of said composite clock forming means, said toggling means including means for generating a first output which toggles between a high and a low state in response to each one of a set of unidirectional going transitions in said composite clock; and first timing means, connected to the first output of said toggling means and said detecting means, said first timing means for generating a first timing signal coincident with the start of each of said guaranteed transitions in said incoming waveform.

2. The circuit arrangement in accordance with claim 1 wherein said toggling means is characterized as including a logical flip-flop, said logical flip-flop responsive to each one of said set of unidirectional going transitions.

3. The circuit arrangement in accordance with claim 1 wherein said detecting means includes:

first detecting means, responsive to said incoming waveform and a first one of said delayed versions of said incoming waveform, said first detecting means for generating said first transition waveform, said first transition waveform providing a pulse coincident with the start of each transition in said incoming waveform; and second detecting means, responsive to a second and a third of said delayed versions of said incoming waveform, said second detecting means for generating said second transition waveform, said second transition waveform providing a pulse occurring at a time after the start of each transition in said incoming waveform and before a period T after the start of each transition in said incoming waveform.

4. The circuit arrangement in accordance with claim 3 wherein said composite clock forming means includes a logical OR gate connected to the outputs of said first and said second detecting means.

5. The circuit arrangement in accordance with claim 3 wherein said toggling means further includes a second output, said second output providing an output signal which is the inverse of said toggling means first output.

6. The circuit arrangement in accordance with claim 5 wherein said isolating means further includes second timing means connected to the second output of said toggling second timing means and said second detecting means, said means for generating a second timing signal commencing ½ T after the start of each of said guaranteed transitions in said input waveform.

7. The circuit arrangement in accordance with claim 6 wherein said composite clock formed at the output of said composite clock forming means has two unidirectional transitions per bit cell, each of said two unidirectional transitions per bit cell spaced ½ T apart.

8. The circuit arrangement in accordance with claim 3 or 6 wherein the first, second and third of said delayed versions of said incoming waveform correspond to the incoming waveform delayed by ¼ T, ½ T and ¾ T respectively.

9. The circuit arrangement in accordance with claim 3 or 6 wherein said first detecting means includes a first logical exclusive OR gate and said second detecting means includes a second logical exclusive OR gate, said first exclusive OR gate receiving its inputs from the incoming waveform and the first of said delayed versions of said incoming waveform, said second exclusive OR gate receiving its inputs from the second and the third of said delayed versions of said incoming waveform.

10. The circuit arrangement in accordance with claim 6 wherein said second timing means includes a second logical NAND gate, said second logical NAND gate receiving its inputs from the second output of said toggling means and the output of said second detecting means.

11. The circuit arrangement in accordance with claim 10 wherein said delay line means includes a digital delay line receiving its input from said incoming waveform.

12. A circuit arrangement for reconstructing the timing information encoded in an incoming double frequency transition-event waveform, said incoming waveform characterized as including both guaranteed and non-guaranteed transitions, said incoming waveform further characterized as having a bit cell duration of T, said circuit arrangement comprising:

delay line means, responsive to said incoming waveform, said delay line means for generating delayed versions of said incoming waveform;

detecting means, responsive to said incoming waveform and said generated delayed versions of said incoming waveform, said detecting means for detecting each transition in said incoming waveform and producing first and second transition waveforms, each of said waveforms identifying each transition in said incoming waveform, the second transition waveform corresponding to the first transition waveform delayed by a fixed time interval; and isolating means, connected to said detecting means, said isolating means for isolating out the set of guaranteed transitions in said detected transitions, said isolating means including a logical OR gate responsive to said detecting means, a logical flip-flop responsive to said logical OR gate, and a first logical NAND gate responsive to said detecting means and said flip-flop.

13. The circuit arrangement in accordance with claim 12 wherein said detecting means includes:

a first logical exclusive OR gate receiving its inputs from said incoming waveform and a first one of said delayed versions of said incoming waveform; and a second logical exclusive OR gate receiving its inputs from a second one and a third one of said delayed versions of said incoming waveform.

14. The circuit arrangement in accordance with claim 13 wherein:

said logical OR gate receives its inputs from the outputs of said first and said second exclusive OR gates;

said logical flip-flop receives its clocking input from the output of said logical OR gate; and said first logical NAND gate receives its inputs from the output of said first exclusive OR gate and the true output of said flip-flop, whereby a first set of said timing information is reconstructed at the output of said first NAND gate.

15. The circuit arrangement in accordance with claim 14 wherein said isolating means further includes a second logical NAND gate receiving its inputs from the output of said second exclusive OR gate and the false output of said flip-flop, whereby a second set of said timing information is reconstructed at the output of said second NAND gate.

16. The circuit arrangement in accordance with claim 15 wherein said logical flip-flop is characterized as being triggered by a negative going transition.

17. The circuit arrangement in accordance with claim 16 wherein said logical flip-flop is further characterized as being a J-K type, the J and the K inputs to which are tied in an active state.

18. The circuit arrangement in accordance with claim 12 wherein said detecting means includes:
   first detecting means, responsive to said incoming waveform and a first one of said delayed versions of said incoming waveform, said first detecting means for generating said first transition waveform, said first transition waveform providing a pulse coincident with the start of each transition in said incoming waveform; and
   said detecting means, responsive to a second and third of said delayed versions of said incoming waveform, said second detecting means for generating said second transition waveform, said second transition waveform providing a pulse occurring at a time after the start of each transition in said incoming waveform and before a period T after the start of each transition in said incoming waveform.

19. The circuit arrangement in accordance with claim 18 wherein said first detecting means includes a first logical exclusive OR gate and said second detecting means includes a second logical exclusive OR gate, the first logical exclusive OR gate receiving its inputs from the incoming waveform and the first one of said delayed versions of said incoming waveform, the second logical exclusive OR gate receiving its inputs from the second and third of said delayed versions of said incoming waveform.

20. The circuit arrangement in accordance with claim 19 wherein the first, second and third of said delayed versions of said incoming waveform correspond to the incoming waveform delayed by $\frac{1}{4}$ T, $\frac{1}{2}$ T and $\frac{3}{4}$ T respectively.

21. The circuit arrangement in accordance with claim 20 wherein said delay line means includes a digital delay line receiving its input from said incoming waveform.

22. The circuit arrangement in accordance with claim 13 wherein said delay line means includes means for generating three delayed versions of said incoming waveform, said first, second, and third delayed versions corresponding to the incoming waveform delayed by $\frac{1}{4}$ T, $\frac{1}{2}$ T and $\frac{3}{4}$ T, respectively.

23. A circuit arrangement for reconstructing the timing information encoded in an incoming double frequency transition-event waveform, said incoming waveform characterized as including both guaranteed and non-guaranteed transitions, said incoming waveform further characterized as having a bit cell duration of T, said circuit arrangement comprising:
   delay line means, responsive to said incoming waveform, said delay line means for generating delayed versions of said incoming waveform;
   detecting means, responsive to said incoming waveform and said generated delayed versions of said incoming waveform, said detecting means for detecting each transition in said incoming waveform and producing first and second transition waveforms, each of said transition waveforms identifying each transition in said incoming waveform, the second transition waveform corresponding to the first transition waveform delayed by a fixed time interval;
   composite clock forming means, connected to said detecting means, said composite clock forming means for forming a composite clock having two unidirectional going transitions per bit cell;
   toggling means, receiving an input from the output of said composite clock forming means, said toggling means including means for generating a first output which toggles between a high and low state in response to each of said unidirectional going transitions provided at its input from said composite clock forming means; and
   first timing means including a first logical NAND gate, said first logical NAND gate receiving its inputs from the first output of said toggling means and said detecting means, said first timing means for generating a first timing signal coincident with the start of each of said guaranteed transitions in said incoming waveform.

24. The circuit arrangement in accordance with claim 23 wherein said detecting means includes:
   first detecting means, responsive to said incoming waveform and a first one of said delayed versions of said incoming waveform, said first detecting means for generating said first transition waveform, said first transition waveform providing a pulse coincident with the start of each transition in said incoming waveform;
   second detecting means, responsive to a second and a third of said delayed versions of said incoming waveform, said second detecting means for generating said second transition waveform, said second transition waveform providing a pulse occurring at a time after the start of each transition in said incoming waveform and before a period T after the start of each transition in said incoming waveform; and
   wherein the input to said first logical NAND gate from said detecting means is connected to the output of said first detecting means.

25. A circuit arrangement for reconstructing the timing information encoded in an incoming double frequency transitionevent waveform, said incoming waveform characterized as including both guaranteed and non-guaranteed transitions, said incoming waveform further characterized as having a bit cell duration of T, said circuit arrangement comprising:
   delay line means, responsive to said incoming waveform, said delay line means for generating delayed versions of said incoming waveform;
   detecting means, responsive to said incoming waveform and said generated delayed versions of said incoming waveform, said detecting means for detecting each transition in said incoming waveform and producing first and second transition waveforms, each of said transition waveforms identifying each transition in said incoming waveform;
   isolating means, connected to said detecting means, said isolating means for isolating out the set of guaranteed transitions in said detected transitions, whereby at least one set of timing information is reconstructed, said isolating means including
   composite clock forming means, connected to said detecting means, said composite clock forming means for forming a composite clock having two unidirectional going transitions per bit cell; toggling means, connected to said composite clock forming means, said toggling means for generating a first output which toggles between a high and low state in response to each of said unidirectional going transitions; and first timing means, connected to said toggling means and said detecting means, said first timing means for generating a first timing signal coincident with the start of each of said guaranteed transitions in said incoming waveform.

26. The circuit arrangement in accordance with claim 25 wherein said detecting means includes:

first detecting means, responsive to said incoming waveform and a first one of said delayed versions of said incoming waveform, said first detecting means for generating said first transition waveform, said first transition waveform providing a pulse coincident with the start of each transition in said incoming waveform; and second detecting means, responsive to a second and third of said delayed versions of said incoming waveform, said second detecting means for generating said second transition waveform, said second transition waveform corresponding to the first transition waveform delayed by a fixed time interval, the second transition waveform providing a pulse occurring at a time after the start of each transition in said incoming waveform and before a period T after the start of each transition in said incoming waveform.

27. The circuit arrangement in accordance with claim 26 wherein the first, second and third delayed versions of said incoming waveform correspond to the incoming waveform delayed by ¼ T, ½ T, and ¾ T respectively.

28. The circuit arrangement in accordance with claim 26 wherein said first detecting means includes a first logical exclusive OR gate and said second detecting means includes a second logical exclusive OR gate, said first exclusive OR gate receiving its inputs from the incoming waveform and the first delayed version of said incoming waveform, said second exclusive OR gate receiving its inputs from the second and the third delayed versions of said incoming waveform.

29. The circuit arrangement in accordance with claim 28 wherein:

said composite clock forming means includes a logical OR gate receiving its inputs from the outputs of said first and said second exclusive OR gates;

said toggling means includes a logical flip-flop receiving its clocking input from the output of said OR gate; and said first timing signal generating means includes a logical NAND gate receiving its inputs from the output of said first exclusive OR gate and the true output of said flip-flop.

30. The circuit arrangement in accordance with claim 29 wherein said delay line means includes a digital delay line receiving its input from said incoming waveform.

31. A circuit arrangement for reconstructing the timing information encoded in an incoming double frequency transitionevent waveform, said incoming waveform characterized as including both guaranteed and non-guaranteed transitions, said incoming waveform further characterized as having a bit cell duration of T, said circuit arrangement comprising:

delay line means, responsive to said incoming waveform, said delay line means for generating delayed versions of said incoming waveform;

detecting means, responsive to said incoming waveform and said generated delayed versions of said incoming waveform, said detecting means for detecting each transition in said incoming waveform and producing first and second transition waveforms, each of said transition waveforms identifying each transition in said incoming waveform, the second transition waveform corresponding to the first transition waveform delayed by a fixed time interval; and isolating means, connected to said detecting means, said isolating means for isolating out the set of guaranteed transitions in said detected transitions, said isolating means including a first logical NAND gate responsive to said detecting means to produce at the output of said first logical NAND gate a first set of timing information.

32. The circuit arrangement in accordance with claim 31 wherein said first logical NAND gate receives one of its inputs from an output of said detecting means.

33. The circuit arrangement in accordance with claim 32 wherein said first set of timing information identifies the commencement of each guaranteed transition in said incoming waveform.

34. The circuit arrangement in accordance with claim 31 wherein said isolating means further includes:

a logical OR gate receiving its inputs from the outputs of said detecting means; and a logical flip-flop receiving its clocking input from the output of said logical OR gate.

35. The circuit arrangement in accordance with claim 34 wherein said detecting means includes:

a first logical exclusive OR gate receiving its inputs from said incoming waveform and a first one of said delayed versions of said incoming waveform; and a second logical exclusive OR gate receiving its inputs from a second and a third delayed version of said incoming waveform.

36. The circuit arrangement in accordance with claim 35 wherein said first logical NAND gate receives its inputs from said first logical exclusive OR gate and said logical flip-flop.

* * * * *